United States Patent
Yang et al.

(10) Patent No.: US 9,524,534 B2
(45) Date of Patent: Dec. 20, 2016

(54) PROCESSING OF PRIMITIVE BLOCKS IN PARALLEL TILING ENGINE PIPES

(71) Applicant: Imagination Technologies Limited, Kings Langley (GB)

(72) Inventors: Xile Yang, Rickmansworth (GB); Robert Theed, Langport (GB)

(73) Assignee: Imagination Technologies Limited, Kings Langley (GB)

( * ) Notice: Subject to any disclaimer, the term of this patent is extended or adjusted under 35 U.S.C. 154(b) by 11 days.

(21) Appl. No.: 14/616,932

(22) Filed: Feb. 9, 2015

(65) Prior Publication Data

US 2015/0228049 A1    Aug. 13, 2015

(30) Foreign Application Priority Data

Feb. 13, 2014    (GB) .................................. 1402492.1

(51) Int. Cl.
  *G06F 15/80*    (2006.01)
  *G06T 1/20*    (2006.01)
  *G06T 15/00*    (2011.01)

(52) U.S. Cl.
  CPC .............. *G06T 1/20* (2013.01); *G06T 15/005* (2013.01); *G06T 2210/52* (2013.01)

(58) Field of Classification Search
  CPC .... G06T 2210/12; G06T 15/405; G06T 15/10; G06T 2210/52; G09G 2360/122
  See application file for complete search history.

(56) References Cited

U.S. PATENT DOCUMENTS

| 4,570,233 | A | 2/1986 | Yan et al. |
| 5,321,805 | A | 6/1994 | Hayman et al. |
| 2009/0174706 | A1* | 7/2009 | Howson ................... G06T 1/20 345/419 |
| 2011/0242113 | A1* | 10/2011 | Keall .................... G06F 9/3857 345/505 |
| 2014/0139534 | A1* | 5/2014 | Tapply .................. G06T 15/005 345/522 |
| 2014/0267256 | A1* | 9/2014 | Heggelund ............. G06T 15/40 345/421 |

FOREIGN PATENT DOCUMENTS

EP    1612737 A2    1/2006

* cited by examiner

*Primary Examiner* — Hau Nguyen
(74) *Attorney, Agent, or Firm* — Vorys, Sater, Seymour and Pease LLP; Vincent M DeLuca

(57) ABSTRACT

A tiling unit is arranged to process a sequence of primitive blocks using multiple parallel tiling engine pipes. Each tiling engine pipe processes a respective primitive block, and determines priorities for regions of the respective primitive block based on whether the primitive block overlaps with any of the other primitive blocks currently being processed in the parallel tiling engine pipes. Each tiling engine pipe processes the regions of its primitive block in a tile-order based on the priorities of the regions. The submission order of the primitives should be maintained when primitive identifiers are written into display lists. Therefore, the priority of a region of a first primitive block is increased (or decreased) if it overlaps with another primitive block which has a higher (or lower) sequence number and which is currently being processed in another tiling engine pipe. This reduces the time that the tiling engine pipes are idle.

21 Claims, 8 Drawing Sheets

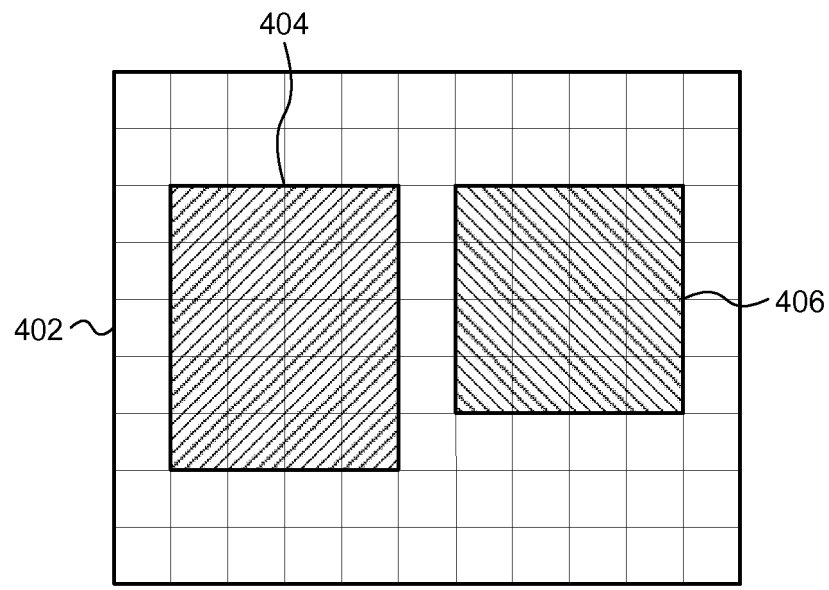
FIGURE 4a
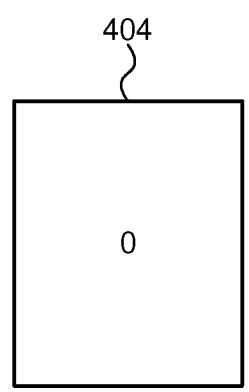 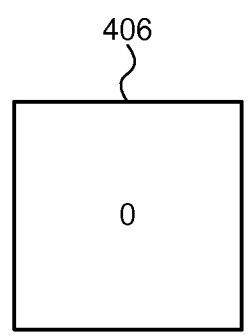
FIGURE 4b      FIGURE 4c

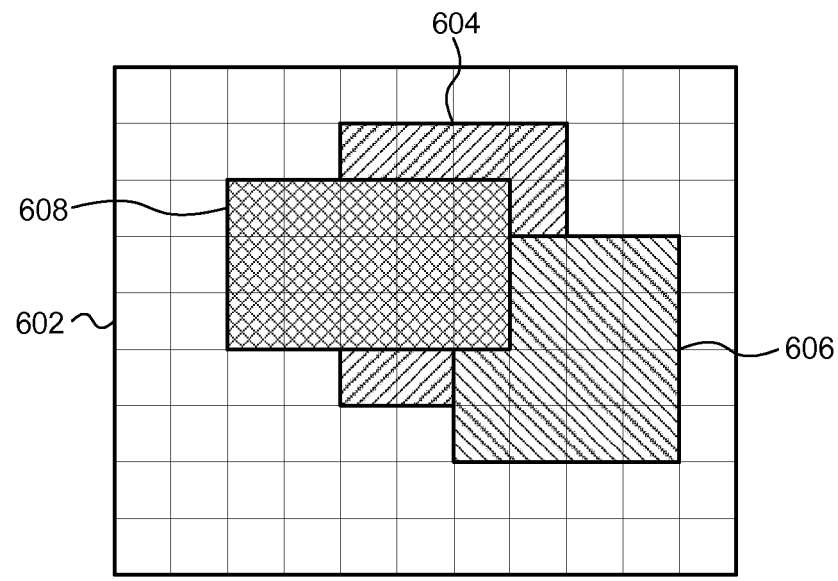
FIGURE 6a
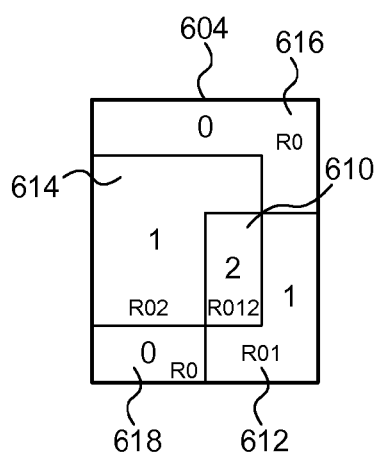 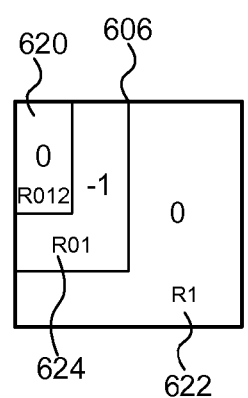 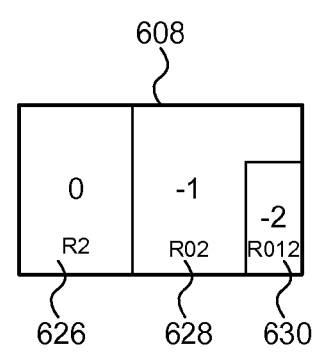
FIGURE 6b  FIGURE 6c  FIGURE 6d

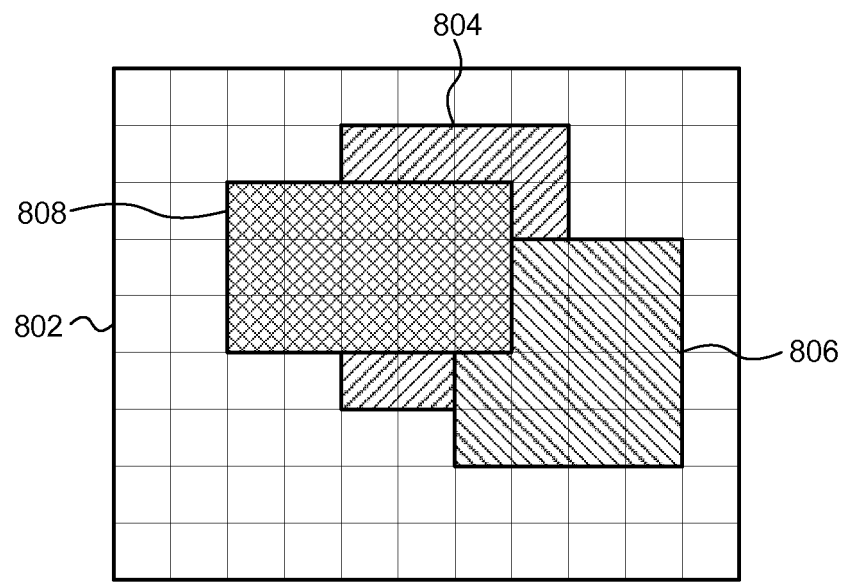
FIGURE 8a
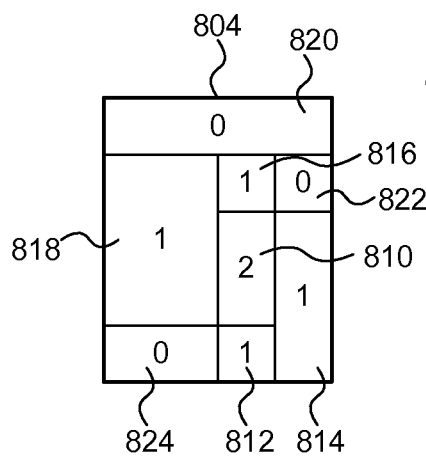 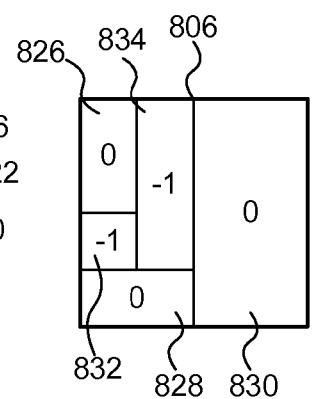 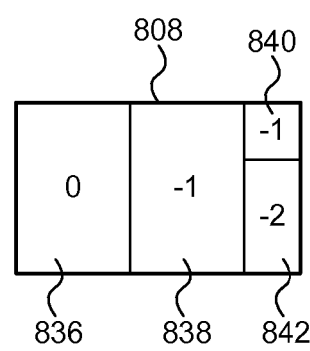
FIGURE 8b      FIGURE 8c      FIGURE 8d

PROCESSING OF PRIMITIVE BLOCKS IN PARALLEL TILING ENGINE PIPES

BACKGROUND

Graphics processing systems are used to render images, e.g. for display on a screen. Image data is received at a graphics processing system, which transforms the image data into screen space using well-known methods. The transformed image data describes primitives which are to be rendered by the graphics processing system, wherein each of the primitives comprises one or more fragments which correspond to a respective one or more sample positions of a rendering space of the graphics processing system. In some examples, a single sample position may correspond to a pixel position of the final rendered image, but in other examples, more than one (e.g. four) sample positions may correspond to each pixel position. Some graphics processing systems are tile-based in the sense that they comprise a rendering space which is subdivided into a plurality of regions (herein referred to as "tiles"), which each comprise a plurality of sample positions. Tiles are usually rectangular (wherein the term "rectangular" is used herein to include square), but they may be other shapes such as triangular or hexagonal. The rendering space may correspond to an image for display on a screen, but other render targets, such as texture data in memory, are also possible. Tiles can be various sizes, for example tiles may be 16×16 pixels. In one example of a screen high resolution image there are 1280× 1024 pixels. Therefore, as an example, such a high resolution image may be sub-divided into 5120 tiles, each comprising 16×16 pixels.

A bounding box is determined for each primitive defining a group of one or more tiles which include all of the fragments of the primitive within the rendering space. A tiling unit processes a primitive for each tile inside the primitive's bounding box to determine whether the primitive is present within the tile (i.e. at least partially overlapping the tile). Primitive identifiers of the primitives which are present within a tile are added into a display list for that tile. This facilitates further processing to be performed on a tile-by-tile basis in a tile-based graphics processing system because for each tile, the respective display list indicates which primitives are needed in order to process the tile. The further processing of the primitives that are present within a tile often relies on the submission order of the primitives. For example, the processing of translucent primitives may be reliant on the primitives being submitted in a back-to-front order. A graphics processing system typically relies on an application submitting primitives in the correct order, and as such the tiling process should not alter the submission order of the primitives from that in which the primitives are received. That is, the original submission order of primitives has to be preserved in each of the display lists for the tiles. In some systems, the primitives are organised into primitive blocks, wherein each primitive block is associated with a sequence number, which can be used to ensure that the order of the primitive blocks is maintained.

The tiling unit may include a tiling engine pipe which processes a primitive block of primitives at a time to determine which tiles the primitives within the primitive block are present within. Using a single tiling engine pipe in the tiling unit helps to ensure that the order of the primitives is not altered by the tiling process, but as the number of primitives in a scene increases, and/or as the number of tiles in the rendering space increases, the amount of processing that is required to be performed by a single tiling engine pipe increases, and this may become a bottleneck in the tiling process.

SUMMARY

To improve the performance of a tiling unit (e.g. to reduce the latency of the processing performed by the tiling unit), multiple tiling engine pipes may be implemented to perform the tiling processes on respective primitive blocks in parallel. Processing multiple primitive blocks in parallel in the tiling unit may allow the tiling of the primitives to be performed faster. As described above, the original submission order of the primitives has to be preserved in the display lists for the tiles. It is trivial for each tiling engine pipe to maintain the order of the primitives within a particular primitive block, but if more than one of the parallel tiling engine pipes are processing primitive blocks which overlap the same tile, then it is important to ensure that primitive identifiers for primitives of an earlier primitive block (e.g. a primitive block with a lower sequence number) are written to the display list for a tile before primitive identifiers for primitives of a later primitive block (e.g. a primitive block with a higher sequence number) are written to the display list for the same tile. This may mean that the tiling engine pipe which is processing the primitives of the later primitive block has to wait for another tiling engine pipe which is processing the earlier primitive block to finish writing primitive identifiers into the display list for the tile. Having tiling engine pipes waiting (i.e. idle) is not desirable. That is, the performance of the tiling unit may suffer when primitive blocks which are being processed in parallel by the parallel tiling engine pipes have overlapping bounding boxes, as this can result in some of the tiling engine pipes being idle as they wait for another tiling engine pipe to process primitives of an earlier primitive block. It may therefore be beneficial for the tiling unit to optimise the scheduling of tiling engine pipes to thereby reduce idle time of the tiling engine pipes.

According to examples described herein, each of a plurality of parallel tiling engine pipes processes a respective primitive block, and determines a priority for each of a plurality of regions of the respective primitive block based on whether the primitive block overlaps with any of the other primitive blocks currently being processed in the parallel tiling engine pipes. Each region for which a priority is determined may comprise one tile or a plurality of tiles. For example, regions in a first primitive block which overlap with other primitive blocks currently being processed in other tiling engine pipes are prioritised based upon whether the sequence number of the other primitive block is greater than or less than that of the first primitive block. In order to maintain the submission order of primitives, primitive identifiers for primitives from primitive blocks with lower sequence numbers are written into the display lists for the tiles before primitive identifiers for primitives from primitive blocks with higher sequence numbers. Therefore, in examples described herein, a priority given to a region of the first primitive block is higher if it overlaps with a region of another primitive block which has a higher sequence number and which is currently being processed in another tiling engine pipe. Furthermore, in examples described herein, a priority given to a region of the first primitive block is lower if it overlaps with a region of another primitive block which has a lower sequence number and which is currently being processed in another tiling engine pipe. In this way, the amount of time that the tiling engine pipes spend in an idle state may be reduced.

There is provided a method of processing a sequence of primitive blocks in a plurality of tiling engine pipes within a graphics processing system configured to use a rendering space which is subdivided into a plurality of tiles, wherein the tiling engine pipes are arranged to process respective primitive blocks in parallel, and wherein a location of each of the primitive blocks within the rendering space is indicated by a respective location indicator, and a position of each of the primitive blocks within the sequence of primitive blocks is indicated by a respective sequence indicator, the method comprising, for each of a plurality of the respective primitive blocks: determining a priority for each of a plurality of regions of the respective primitive block, each of the regions comprising one or more tiles, wherein if the location indicators of the primitive blocks currently being processed in the parallel tiling engine pipes indicate that there are overlapping primitive blocks within a particular region of the respective primitive block then the priority for the particular region is determined based on the sequence indicators of the overlapping primitive blocks; and the tiling engine pipe which is arranged to process the respective primitive block processing primitives of the respective primitive block for tiles of the regions of the respective primitive block in a tile-order based on the determined priorities for the regions, to thereby determine for each of the tiles of the regions of the respective primitive block, which, if any, of the primitives of the respective primitive block are present within the tile.

The step of determining the priorities for the plurality of regions of the respective primitive block may be performed by either: (i) the tiling engine pipe which is arranged to process the respective primitive block, or (ii) a control module.

There is provided a tiling unit configured to process a sequence of primitive blocks within a graphics processing system configured to use a rendering space which is subdivided into a plurality of tiles, wherein the tiling unit is configured to use a respective location indicator to indicate a location of each of the primitive blocks within the rendering space, and to use a respective sequence indicator to indicate a position of each of the primitive blocks within the sequence of primitive blocks, wherein the tiling unit comprises a plurality of tiling engine pipes which are configured to process respective primitive blocks in parallel, and wherein for each of a plurality of the respective primitive blocks, the tiling unit is configured to: determine a priority for each of a plurality of regions of the respective primitive block, each of the regions comprising one or more tiles, wherein if the location indicators of the primitive blocks being processed in the parallel tiling engine pipes indicate that there are overlapping primitive blocks within a particular region of the respective primitive block then the priority for the particular region is determined based on the sequence indicators of the overlapping primitive blocks; and use the tiling engine pipe which is configured to process the respective primitive block to process primitives of the respective primitive block for tiles of the regions of the respective primitive block in a tile-order based on the determined priorities for the regions, to thereby determine for each of the tiles of the regions of the respective primitive block, which, if any, of the primitives of the respective primitive block are present within the tile.

There may also be provided computer readable code adapted to perform the steps of any of the methods described herein when the code is run on a computer. Furthermore, there may be provided computer readable code for generating a tiling unit according to any of examples described herein. The computer readable code may be encoded on a computer readable storage medium.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which:

FIGS. 4a to 4c represent priorities for two non-overlapping primitive blocks in a second example;

FIGS. 6a to 6d represent priorities for regions of three overlapping primitive blocks in a fourth example;

FIGS. 8a to 8d represent priorities for regions of three overlapping primitive blocks in a sixth example.

Figure 1:
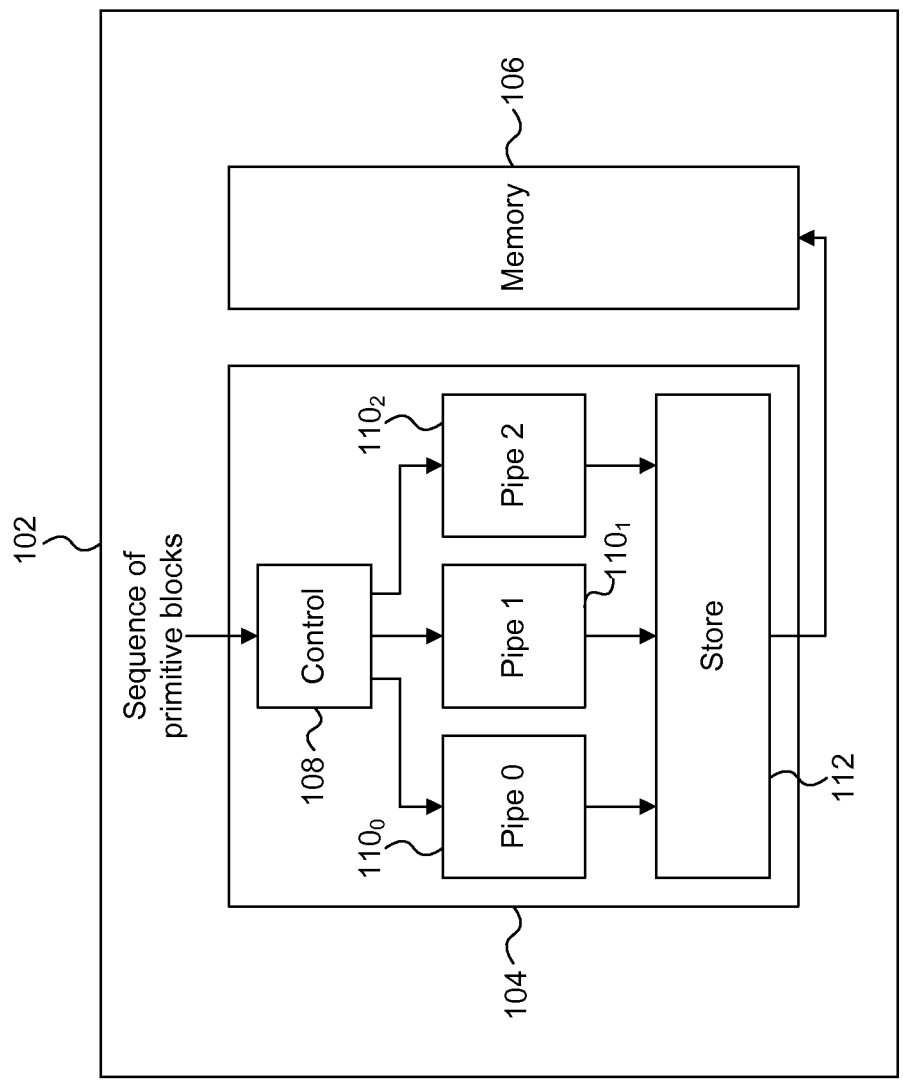
FIG. 1 shows a schematic diagram of part of a graphics processing system.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

Embodiments will now be described by way of example only. FIG. 1 shows a graphics processing system 102 which comprises a tiling unit 104 and a memory 106. The tiling unit 104 comprises a control module 108, three tiling engine pipes $110_0$, $110_1$ and $110_2$, and a store 112 for storing display lists. In the examples described in detail herein, the elements of the tiling unit 104 shown in FIG. 1 are implemented in hardware, but in other examples some or all of the elements of the tiling unit may be implemented in software to be executed on a computer processor. Furthermore, as will be apparent to those skilled in the art, the graphics processing system 102 may comprise other components in addition to those shown in FIG. 1, but for the purposes of this description is it sufficient to describe only the components that are relevant to the tiling process.

The control module 108 is arranged to receive a sequence of primitive blocks comprising primitives which are already in the screen space in which an image is to be rendered. For example, the graphics processing system 102 may implement vertex processing operations in order to process incoming image data received from an application to thereby transform the image data into screen space and to provide the sequence of primitive blocks to the tiling unit 104. The control module 108 is configured to provide primitive blocks to the tiling engine pipes 110. The tiling engine pipes 110 are configured to perform tiling processes on the primitives of a primitive block to thereby determine which tiles overlap with which primitives of the primitive block, as described in more detail below. Outputs of the tiling engine pipes 110 are coupled to the store 112. The tiling unit 104 is configured to provide an output from the store 112 to the memory 106 such that the results of the tiling process (i.e. display lists for the tiles) can be stored in the memory 106.

Figure 2:
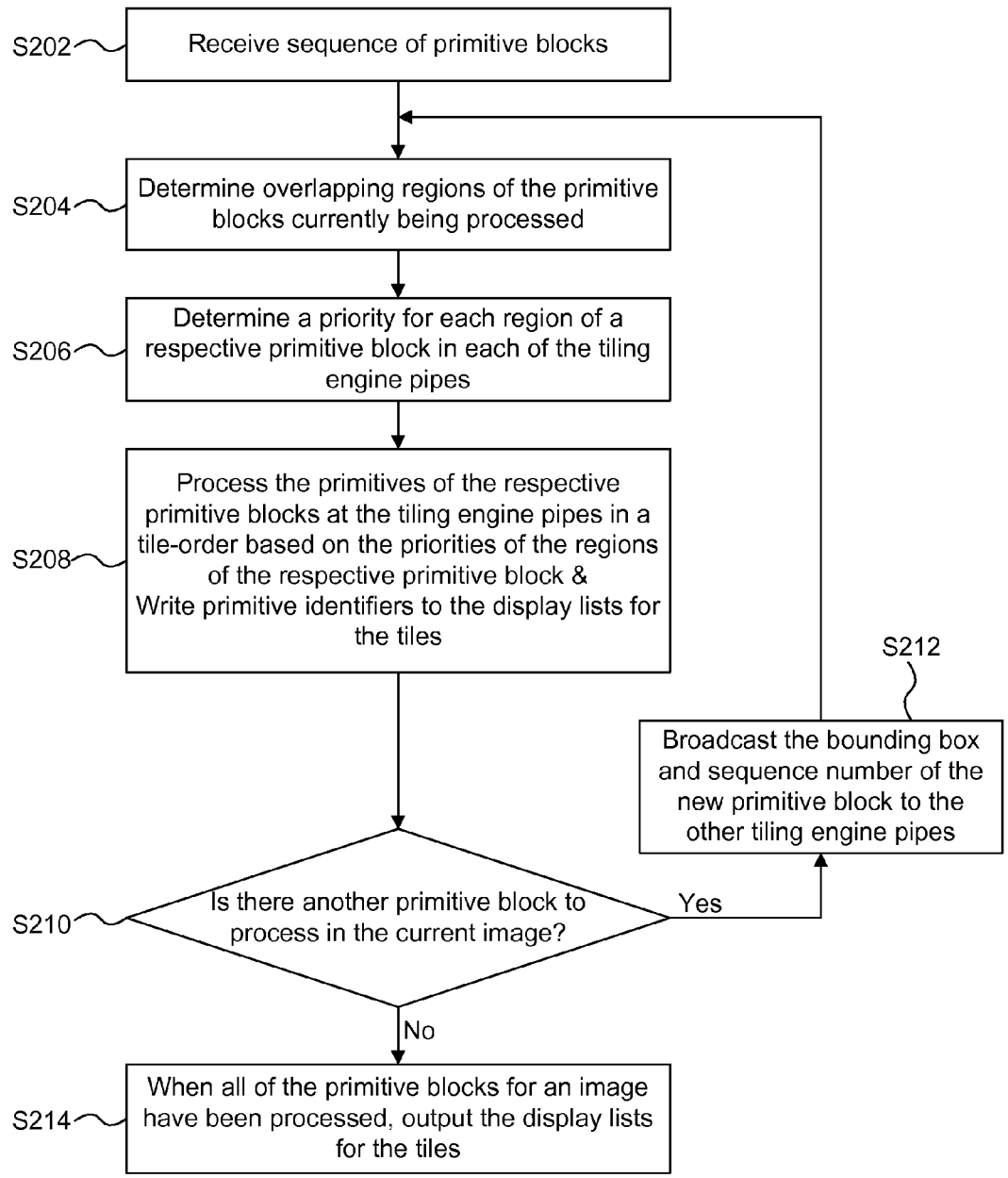
FIG. 2 is a flow chart for a method of processing a sequence of primitive blocks.

The operation of the tiling unit 104 is described with reference to the flow chart of FIG. 2. In step S202 the tiling unit 104 (in particular, the control module 108) receives a sequence of primitive blocks including primitives, which as described above are already in screen space. The primitives are included within the sequence of primitive blocks in submission order, such that the order of primitives within a primitive block is maintained. Furthermore, each primitive block has a sequence indicator (e.g. a sequence number) which indicates the position of the primitive block within the sequence of primitive blocks. The sequence number can be used to ensure that the order of the primitive blocks in the sequence is maintained. The primitives may be organised into the primitive blocks such that, for example, the maximum number of primitives in a primitive block is N and the maximum number of vertices in a primitive block is M. The first N primitives in the incoming image data are included in a first primitive block and then the next N primitives are included in the next primitive block, and so on. As an example, N may be 80 or some other suitable number. The number of primitives included in each primitive block may be fixed or variable. Primitives may share vertices with other primitives in the same primitive block. It can be beneficial to group primitives which share vertices into the same primitive block to allow for more efficient processing of the primitives. In some examples, the number of vertices in the primitive block may reach the maximum value, M, although the number of primitives in the primitive block may still be less than N. In this case, a new primitive block may be started to contain any additional primitives. A new primitive block may also be started when the render state changes. By avoiding multiple render states within one primitive block the storage and processing of the primitives may be optimised.

Each of the primitive blocks has a bounding box which defines an area of the rendering space which fully encompasses the primitives of the primitive block. Methods for determining the bounding box of a primitive block are known in the art, and the details of such methods are beyond the scope of this description. The primitive blocks may be received at the control module 108 with indications of their bounding boxes which have been determined prior to the primitive blocks being provided to the tiling unit 104. Alternatively, the control module 108 may determine the bounding boxes for the received primitive blocks. The bounding box of a primitive block acts as a location indicator which indicates the location of the primitive block within the rendering space. In a simple example, the bounding box is rectangular and aligned to the axes of the rendering space and can therefore be defined by the location of two opposing corners of the rectangular bounding box or by the location of one corner with an indication of the dimensions of the bounding box. It can be appreciated that by using a rectangular bounding box, there may be some tiles within the bounding box which do not overlap with any primitives of the primitive block. In more complicated examples, the bounding box might not be rectangular and might for example include only tiles which overlap with at least one of the primitives of the primitive block. In the examples described herein, the bounding boxes are determined at the granularity of the tiles, such that in these examples the bounding boxes comprise an integer number of tiles.

The control module 108 distributes the primitive blocks to the tiling engine pipes 110. When a tiling engine pipe 110 becomes available to process a new primitive block, the control module 108 provides the next primitive block in the sequence to the available tiling engine pipe 110. When the first primitive block has been received at the control module 108, it is provided to the first tiling engine pipe $110_0$; when the second primitive block has been received at the control module 108, it is provided to the second tiling engine pipe $110_1$; and when the third primitive block has been received at the control module 108, it is provided to the third tiling engine pipe $110_2$. Each of the tiling engine pipes 110 can process the respective primitive blocks in parallel, and when they finish processing a primitive block, the control module 108 provides them with new primitive blocks to process.

Control signals can be broadcast (or otherwise sent) between the different tiling engine pipes 110. For example, control signals can be sent which indicate the bounding box and sequence number of the primitive blocks currently being processed by each of the tiling engine pipes 110. In this way, each tiling engine pipe 110 has access to indications of the bounding box and sequence number for all of the primitive blocks that are currently being processed by the tiling engine pipes 110.

Figures 3A, 3B, 3C, 3D:
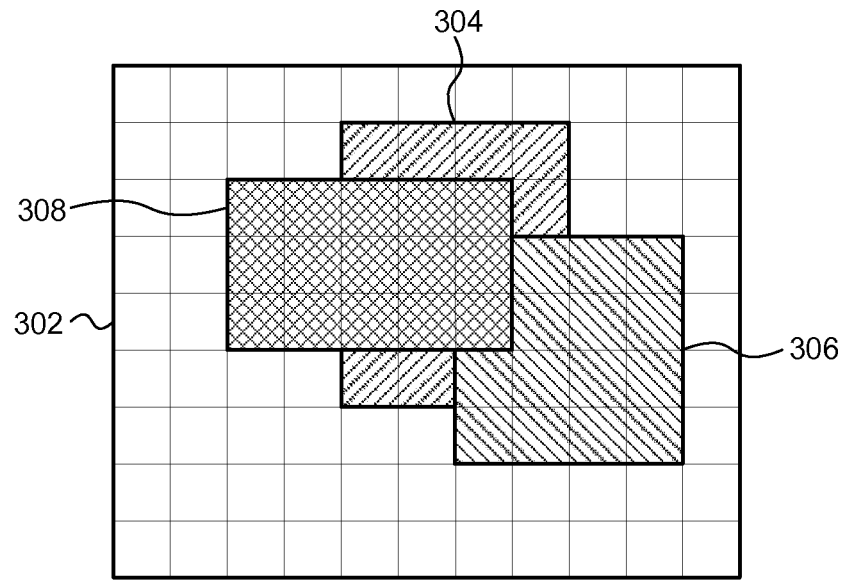
FIGS. 3a to 3d represent priorities for tiles of three overlapping primitive blocks in a first example.

Each of the tiling engine pipes 110 performs the steps S204 to S208 in parallel. In step S204 a tiling engine pipe (e.g. tiling engine pipe $110_0$) uses the bounding boxes of the primitive blocks currently being processed in the tiling engine pipes 110 to determine overlapping regions of the primitive blocks currently being processed in the parallel tiling engine pipes 110. FIG. 3a shows an example in which a rendering space 302 is divided into a 9×11 array of tiles. FIG. 3a shows the bounding box of a first primitive block 304, the bounding box of a second primitive block 306, and the bounding box of a third primitive block 308. The overlap of the bounding boxes in FIG. 3a does not represent the relative depths of the primitives contained in the primitive blocks, but rather the sequence numbers of the primitive blocks, such that primitive block 304 is earlier in the sequence (e.g. has a lower sequence number) than primitive block 306, which in turn is earlier in the sequence (e.g. has a lower sequence number) than primitive block 308. It can be seen that the bounding box of the first primitive block 304 covers a 5×4 block of tiles, the bounding box of the second primitive block 306 covers a 4×4 block of tiles, and the bounding box of the third primitive block 308 covers a 3×5 block of tiles. Some of the tiles of the rendering space 302 represent overlapping regions which are within the bounding boxes of more than one of the primitive blocks.

As described in more detail below, the tiling engine pipes 110 process the primitives within a primitive block on a tile-by-tile basis, such that each tiling engine pipe determines which primitives of the respective primitive block are present within a set of one or more tiles, before then moving on, in a next iteration, to a next set of one or more tiles to determine which primitives of the primitive block are present within the next set of one or more tiles.

In step S206 each of the tiling engine pipes determines a priority for each of a plurality of regions of the respective primitive block. The regions for which the priorities are determined comprise one or more tiles. The priority of a region is determined based on the presence of overlapping primitive blocks in that region. In particular, if the bounding boxes of the primitive blocks currently being processed in the parallel tiling engine pipes 110 indicate that there are overlapping primitive blocks within a particular region then the priority for the particular region is determined based on the sequence numbers of the overlapping primitive blocks. In a first example described herein, the regions for which the priorities are determined each comprise a single tile, i.e. in these examples, a priority is determined for each tile covered by the bounding box of a primitive block. The priorities for the regions determined by a tiling engine pipe 110 can be stored for future use by the tiling engine pipe 110.

In step S208 the tiling engine pipes 110 process the primitives of the respective primitive blocks in a tile-order which is based on the priorities of the regions of the respective primitive block, as determined in step S206. The tile-order defines the order in which the tiling engine pipe 110 considers the tiles to determine whether any of the primitives within the current primitive block are present with the tiles. As described above, in each of a plurality of iterations, a set of one or more tiles may be selected, based on the priorities of the regions, from the tiles which have not yet been processed for the respective primitive block, and the selected set of one or more tiles is processed. The tiling engine pipes 110 write primitive identifiers to the display lists for the tile(s) when the primitives of the primitive block have been processed for the tile(s). As described above the primitive identifiers should be written into the display lists in submission order. Therefore, as part of the process of writing primitive identifiers to a display list of a tile, a tiling engine pipe 110 may check that a primitive block with an earlier sequence number which is currently being processed in another tiling engine pipe has no further primitive identifiers to write to the display list of the tile. Responsive to this check, if necessary the tiling engine pipe 110 may wait before writing the primitive identifiers into the display list for the tile. This check ensures that the submission order of the primitives is maintained in the display lists. As is apparent from the description herein, the priorities are determined with the aim of minimising the amount of waiting that this check will cause. Then the next set of one or more tiles is processed by the tiling engine pipe 110, with the results being written to the appropriate display lists. This repeats until all of the tiles of the primitive block have been processed. The display lists are stored in the store 112. In other examples, the store 112 might not be implemented in the tiling unit 104, and instead the display lists can be written directly to the memory 106. Each of the tiling engine pipes 110 can access the same display lists for the tiles of the rendering space 302.

With reference to FIGS. 3b to 3d there is described an example in which a priority is determined for each tile covered by the bounding boxes of the primitive blocks 304, 306 and 308. The tiles of a primitive block are processed one at a time in this example, i.e. in this example the set of one or more tiles of a primitive block that is processed by a tiling engine pipe 110 in each iteration comprises a single tile. FIG. 3b shows the priorities which are determined for the tiles of the primitive block 304, FIG. 3c shows the priorities which are determined for the tiles of the primitive block 306, and FIG. 3d shows the priorities which are determined for the tiles of the primitive block 308. In this example, for tiles of a primitive block which do not overlap with another primitive block currently being processed by one of the tiling engine pipes 110 (wherein may be referred to herein as the "current primitive blocks") the priority is determined to be zero. In other words, the priority is zero for regions of a primitive block which are not overlapping regions as determined in step S204. For tiles of a primitive block which are in an overlapping region, the priority is determined based on the sequence numbers of the overlapping primitive blocks in the overlapping region. In order to determine the priorities of the tiles in an overlapping region of a first primitive block (e.g. primitive block 304), the sequence number of the first primitive block is compared with the sequence number of a second primitive block which is present in the overlapping region, wherein the first primitive block has a lower sequence number than the second primitive block. In order to maintain the submission order of the primitives, if the primitives for the second primitive block are processed for a tile in the overlapping region, e.g. by the tiling engine pipe $110_1$, before the primitives for the first primitive block are processed for the tile, e.g. by the tiling engine pipe $110_0$, then the tiling engine pipe $110_1$ waits before writing primitive identifiers to the display list for the tile until the tiling engine pipe $110_0$ has finished processing primitives for the first primitive block for the tile.

Therefore to minimise (or at least reduce) the amount of time that the tiling engine pipes 110 are idle, the priorities are determined such that for an overlapping region, each tiling engine pipe 110 compares the sequence number of the respective primitive block that it is processing with the sequence number(s) of each of the other overlapping primitive block(s) in the overlapping region, wherein for each of the other overlapping primitive block(s): (i) if the sequence number of the respective primitive block is greater than that of the overlapping primitive block, the priorities of the tiles in the overlapping region of the respective primitive block are increased (e.g. incremented), and (ii) if the sequence number of the respective primitive block is less than that of the overlapping primitive block, the priorities of the tiles in the overlapping region of the respective primitive block are decreased (e.g. decremented). When there are more than two overlapping primitive blocks in an overlapping region then the priorities can be determined cumulatively, such that the total priority for a tile is the sum of the priorities arising from the comparisons of different pairs of primitive blocks, which are overlapping in the overlapping region.

For example, FIG. 3b shows that the priorities assigned to the tiles of the primitive block 304 which do not overlap with either of the other two current primitive blocks (306 and 308) are given a priority of 0. The priorities assigned to the tiles of the primitive block 304 which overlap with primitive block 306, but not with primitive block 308 are given a priority of 1 because the primitive block 304 comes before the primitive block 306 in the sequence of primitive blocks (i.e. primitive block 304 has a lower sequence number than primitive block 306). Similarly, the priorities assigned to the tiles of the primitive block 304 which overlap with primitive block 308, but not with primitive block 306 are also given a priority of 1 because the primitive block 304 comes before the primitive block 308 in the sequence of primitive blocks (i.e. primitive block 304 has a lower sequence number than primitive block 308). The priorities assigned to the tiles of the primitive block 304 which overlap with both of the other two current primitive blocks (306 and 308) are given a priority of 2 because the primitive block 304 comes before both of the primitive blocks 306 and 308 in the sequence of primitive blocks (i.e. primitive block 304 has a lower sequence number than both primitive blocks 306 and 308).

Continuing with this example, FIG. 3c shows that the priorities assigned to the tiles of the primitive block 306 which do not overlap with either of the other two current primitive blocks (304 and 308) are given a priority of 0. The priorities assigned to the tiles of the primitive block 306 which overlap with primitive block 304, but not with primitive block 308 are given a priority of −1 because the primitive block 306 comes after the primitive block 304 in the sequence of primitive blocks (i.e. primitive block 306 has a higher sequence number than primitive block 304). The priorities assigned to the tiles of the primitive block 306 which overlap with both of the other two current primitive blocks (304 and 308) are given a priority of 0 because the primitive block 306 comes after the primitive block 304 and before the primitive block 308 in the sequence of primitive blocks (i.e. primitive block 306 has a higher sequence number than primitive block 304 and a lower sequence number than primitive block 308).

Continuing with this example, FIG. 3d shows that the priorities assigned to the tiles of the primitive block 308 which do not overlap with either of the other two current primitive blocks (304 and 306) are given a priority of 0. The priorities assigned to the tiles of the primitive block 308 which overlap with primitive block 304, but not with primitive block 306 are given a priority of −1 because the primitive block 308 comes after the primitive block 304 in the sequence of primitive blocks (i.e. primitive block 308 has a higher sequence number than primitive block 304). The priorities assigned to the tiles of the primitive block 308 which overlap with both of the other two current primitive blocks (304 and 306) are given a priority of −2 because the primitive block 308 comes after both of the primitive blocks 304 and 306 in the sequence of primitive blocks (i.e. primitive block 308 has a higher sequence number than both the primitive blocks 304 and 306).

Therefore, in step S208 each tiling engine pipe 110 processes their respective primitive blocks in a tile-order from a tile with the highest priority to a tile with the lowest priority. Each time a tiling engine pipe 110 finishes processing a tile, the tiling engine pipe 110 decides which tile to process next by choosing a tile which has the current highest priority and which hasn't yet been processed. Alternatively, the order in which the tiles are processed could be determined from the initial priority values, before any tiles are actually processed, and then not updated after a tile has been processed. However, this provides fewer opportunities to update the priorities and to adapt the order based on information received from other tiling engine pipes. In general, the decision as to which tiles to process could be made every n tiles, where n is some integer in the range $1 \leq n \leq N_{tiles}$, where $N_{tiles}$ is the total number of tiles in the rendering space 302. In order to keep track of which tiles have been processed, the tiling engine pipes may each store an indication of the tiles of the respective primitive block which it has processed. If more than one unprocessed tile has the current highest priority, then one of the tiles with the current highest priority is chosen, e.g. by choosing the first of the tiles in raster scan order, or by determining whether any dependencies for the tiles have been satisfied, which is described in more detail below.

For the primitive block 304, since the tiles which overlap with all three of the current primitive blocks have a priority of 2 in primitive block 304, these tiles are processed first by the tiling engine pipe $110_0$ to reduce the amount of time that the other tiling engine pipes $110_1$ and $110_2$ may have to wait for these tiles to be processed by the tiling engine pipe $110_0$. Then the tiles which overlap with one other primitive block (i.e. which have a priority of 1) are processed by the tiling engine pipe $110_0$, again to reduce the amount of time that the other tiling engine pipe $110_1$ or $110_2$ may have to wait for these tiles to be processed by the tiling engine pipe $110_0$. Then the tiling engine pipe $110_0$ will process the tiles which do not overlap with other primitive blocks because no other tiling engine pipes are waiting for the tiling engine pipe $110_0$ to finish processing these tiles.

For the primitive block 306, any of the tiles which have a priority of 0 can be processed first. The two tiles which overlap with the primitive blocks in both of the other tiling engine pipes $110_0$ and $110_2$ can be processed, but the results of the processing cannot be written into the display lists for these tiles until the tiling engine pipe $110_0$ has finished processing the primitives of the primitive block 304 in those tiles. Therefore, if these tiles are chosen to be processed first by the tiling engine pipe $110_1$ then the tiling engine pipe $110_1$ may need to wait before writing the primitive identifiers to the display lists for these tiles. To avoid this, as mentioned above, the tiling engine pipe $110_1$ can choose one of the tiles with the current highest priority (i.e. a priority of zero in the example shown in FIG. 3c) by determining whether any dependencies for the tiles have been satisfied. For example, when the tiling engine pipe $110_0$ finishes processing a tile it can send a broadcast signal to the other tiling engine pipes $110_1$ and $110_2$ to indicate that it has finished processing the tile. If all of the tiling engine pipes send similar broadcast signals when they finish processing a tile then each tiling engine pipe can determine which tiles have been processed by the other tiling engine pipes. Therefore, the tiling engine pipe $110_1$ can determine whether the tiling engine pipe $110_0$ has finished processing the tiles which overlap with all three primitive blocks 304, 306 and 308 (i.e. the "overlapping tiles"). If these tiles have not yet been processed by the tiling engine pipe $110_0$ then the tiling engine pipe $110_1$ will process some of the other tiles which have a priority of zero (e.g. the tiles on the right hand side of the primitive block 306). When the tiling engine pipe $110_1$ receives a signal indicating that the tiling engine pipe $110_0$ has finished processing the overlapping tiles then the tiling engine pipe $110_1$ will process those overlapping tiles next. One way to implement this would be to increase the priority of the tiles which are dependent on the processing of another tiling engine pipe when a signal is received indicating that the other tiling engine pipe has finished processing the tiles. For example, the priority of the tiles in the top left of the primitive block 306 which initially have a priority of 0 could be increased to be 1, responsive to receiving an indication that the tiling engine pipe $110_0$ has finished processing those tiles. When the tiling engine pipe $110_1$ has processed all of the tiles shown in FIG. 3c as having a priority of zero then it will process the tiles which overlap with just the primitive block 304 (i.e. which have a priority of −1). By the time the tiling engine pipe $110_1$ starts to process the tiles of primitive block 306 with priority of −1, the tiling engine pipe $110_0$ will be likely to have finished processing these tiles for primitive block 304.

For the primitive block 308, the tiling engine pipe $110_2$ will first process the tiles which do not overlap with other primitive blocks because these tiles do not need to wait for any processing of the other tiling engine pipes $110_0$ and $110_1$. Then the tiles which overlap with one other primitive block (i.e. which have a priority of −1) are processed by the tiling engine pipe $110_2$, because these tiles rely on one other tiling engine pipe 110 (e.g. tiling engine pipe $110_0$) to process the tiles before tiling engine pipe $110_2$ can process the tiles. Since the tiles which overlap with all three of the current primitive blocks have a priority of −2 in primitive block 308, these tiles are processed last by the tiling engine pipe $110_2$ to thereby increase the amount of time that the other tiling engine pipes $110_0$ and $110_1$ have for processing these tiles before these tiles are processed by the tiling engine pipe $110_2$.

It can be appreciated that the priorities assigned to the tiles of the primitive blocks 304, 306 and 308 shown in FIGS. 3a to 3d result in a scheduling of the processing of the primitive blocks in each of the tiling engine pipes 110 which will reduce the amount of time that a tiling engine pipe is idle due to waiting for another tiling engine pipe to finish processing a tile before writing into that tile's display list.

When a tiling engine pipe 110 finishes processing the primitives of a primitive block for all of the tiles in the bounding box of the primitive block, then it is available to process another primitive block, and in step S210 the control module 108 determines whether there is another primitive block to be processed in the current image. If there is, then the new primitive block is provided to the available tiling engine pipe 110 for processing. In step S212 the bounding box and the sequence number of the new primitive block are broadcast (e.g. from the available tiling engine pipe 110) to the other tiling engine pipes 110. Then the method passes back to step S204 and the method steps S204 to S208 are repeated. In this way, the priorities for the tiles of all of the current primitive blocks are recalculated every time one of the tiling engine pipes 110 starts to process a new primitive block. That is, a first tiling engine pipe 110 may receive, from a second tiling engine pipe, a broadcast including a location indicator (i.e. the bounding box) and a sequence indicator of a new primitive block that the second tiling engine pipe is starting to process, and responsive to receiving the broadcast, the first tiling engine pipe 110 re-determines the priorities for regions of the primitive block that it is processing based on the received broadcast. This may include re-determining the overlapping regions responsive to receiving the broadcast.

When there are no new primitive blocks for an image left to process then the method will pass from step S210 to step S214. In step S214 when all of the primitive blocks of an image have been processed and all of the primitive identifiers have been written into the display lists of the tiles in the store 112, then the display lists for the tiles are output from the store 112 to the memory 106. As described above, in some alternative examples, the store 112 is not implemented in the tiling unit 104, and instead the results of the tiling process are written directly from the tiling engine pipes 110 to display lists in the memory 106. The display lists for the tiles can be retrieved from the memory 106 for use in further processing of the primitives in a tile-by-tile manner.

In the example described with reference to FIGS. 3a to 3d, a priority is determined for each tile of the primitive blocks. In this case, a variable sized array is maintained to store the tile priorities for each primitive block and a mask of completed tiles for each tiling engine pipe is stored. The storage of all of this data may be costly in hardware. The principles described in relation to the examples given above may be implemented in different examples, as described below. In particular, the examples given below may be more suited to graphics processing systems in which storage is limited in the hardware, for example if the graphics processing system 102 is to be implemented in a mobile device where the computing resources and available processing power are limited.

For example, rather than determining a priority for each tile of a primitive block, a single priority may be determined for a region which includes a plurality of tiles. In this way, fewer priorities need to be stored. For example, FIG. 4a shows a rendering space 402 in which there are two non-overlapping primitive blocks 404 and 406. FIG. 4b shows that a single priority value of zero can be assigned to the whole of the primitive block 404 and a single priority value of zero can also be assigned to the whole of the primitive block 406. The tiles of the primitive blocks 404 and 406 can be processed in parallel by two of the tiling engine pipes 110 in parallel in any order since the primitive blocks do not overlap and hence there are no dependencies between tiles of the different primitive blocks. It requires less storage to store a single priority of zero for the whole of a primitive block than to store a priority of zero for each of the tiles of the primitive block.

Figure 5A:
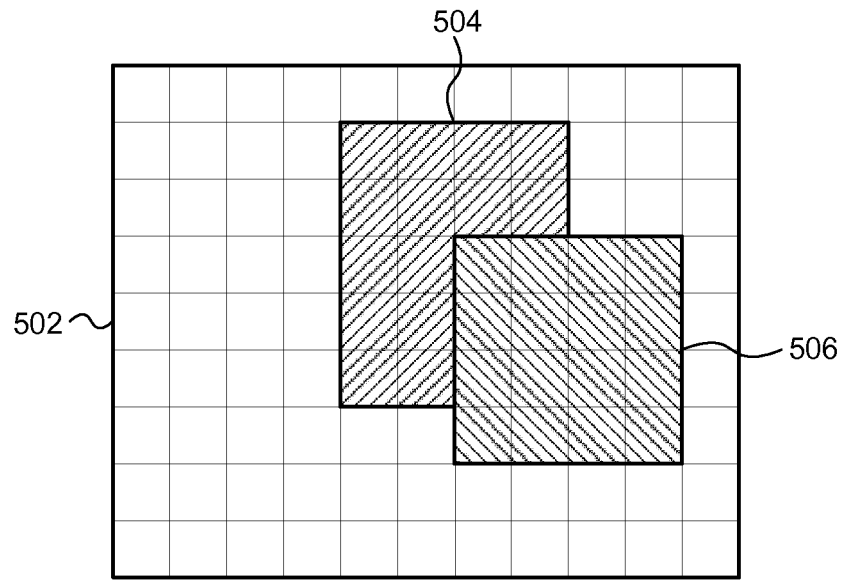
FIGS. 5a to 5c represent priorities for regions of two overlapping primitive blocks in a third example.

In a less trivial example, FIG. 5a shows a rendering space 502 in which there are two overlapping primitive blocks 504 and 506, where primitive block 504 is positioned earlier (i.e. with a lower sequence number) in the sequence of primitive blocks than the primitive block 506. In this example, the tiling engine pipe $110_0$ processes the primitive block 504 and the tiling engine pipe $110_1$ processes the primitive block 506. Each of the tiling engine pipes ($110_0$ and $110_1$) determines the regions for which priorities are to be determined by determining overlapping regions of the primitive blocks (504 and 506) currently being processed in the parallel tiling engine pipes. The priorities for the determined regions can then be determined as described above. Therefore, tiling engine pipe $110_0$ determines that there is a first region 508 of primitive block 504 (labelled "R01" in FIG. 5b) which is overlapping with the primitive block 506, and is given a priority of one. The tiling engine pipe $110_0$ also determines that there is a second region 510 of primitive block 504 (labelled "R0" in FIG. 5b) which is non-overlapping, and is given a priority of zero. Therefore, the tiling engine pipe $110_0$ will process tiles from the region 508 before processing tiles from the region 510. Similarly, the tiling engine pipe $110_1$ determines that there is a first region 512 of primitive block 506 (labelled "R1" in FIG. 5c) which is non-overlapping with the primitive block 504, and is given a priority of zero. The tiling engine pipe $110_1$ also determines that there is a second region 514 of primitive block 506 (labelled "R01" in FIG. 5c, which includes the same tiles as those of region 508) which is overlapping with the primitive block 504, and is given a priority of minus one. Therefore, the tiling engine pipe $110_1$ will process tiles from the region 512 before processing tiles from the region 514.

Figure 5B:
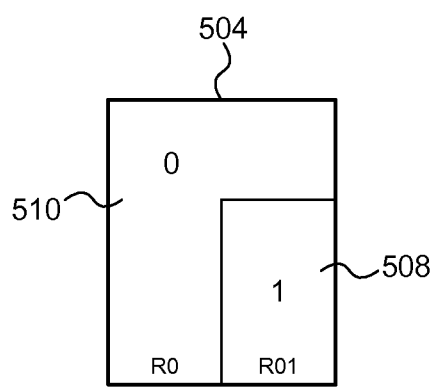
Figure 5C:
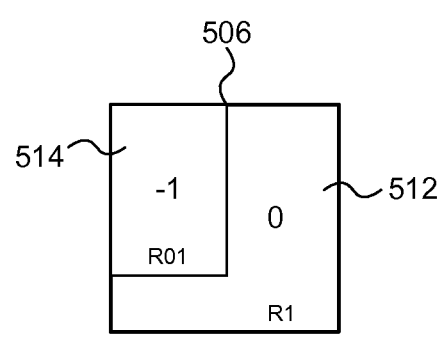

By processing the primitives of the primitive blocks 504 and 506 in accordance with the priorities of the regions shown in FIGS. 5b and 5c it is likely that by the time that the tiling engine pipe $110_1$ starts to process tiles from the region 514, the tiling engine pipe $110_0$ will have finished (or at least already have started) processing the tiles from the region 508. Therefore, the impact on performance due to the tiling engine pipe $110_1$ waiting for the tiling engine pipe $110_0$ to process tiles is minimised.

FIGS. 6a to 6d show another example in which a rendering space 602 includes three overlapping primitive blocks 604, 606 and 608. In this example, the tiling engine pipe $110_0$ processes the primitive block 604, the tiling engine pipe $110_1$ processes the primitive block 606, and the tiling engine pipe $110_2$ processes the primitive block 608. Each of the tiling engine pipes 110 determines the regions for which priorities are to be determined by determining overlapping regions of the primitive blocks (604, 606 and 608) currently being processed in the parallel tiling engine pipes. In other examples, the regions for which priorities are to be determined may be determined in one or more modules other than the tiling engine pipes 110, e.g. the control module 108 could determine the regions. The determined regions are determined at the granularity of a tile meaning that each region includes an integer number of tiles. The priorities for the determined regions can then be determined as described above. Therefore, the tiling engine pipe $110_0$ determines that there is a first region 610 of primitive block 604 (labelled "R012" in FIG. 6b) which is overlapping with both of the primitive blocks 606 and 608, and is given a priority of two. The tiling engine pipe $110_0$ also determines that there is a second region 612 of primitive block 604 (labelled "R01" in FIG. 6b) which is overlapping with the primitive block 606, and is given a priority of one. The tiling engine pipe $110_0$ also determines that there is a third region 614 of primitive block 604 (labelled "R02" in FIG. 6b) which is overlapping with the primitive block 608, and is also given a priority of one. The tiling engine pipe $110_0$ also determines that there are fourth and fifth regions 616 and 618 of primitive block 604 (labelled "R0" in FIG. 6b) which are non-overlapping with the primitive blocks 606 and 608, and are given priorities of zero.

Therefore, the tiling engine pipe $110_0$ will process tiles from the region 610 first. Following those tiles the tiling engine pipe $110_0$ will either process tiles from region 612 or from region 614 since they both have a priority of 1. The tiling engine pipe $110_0$ may choose to process tiles from region 612 before processing tiles from region 614 because region 612 overlaps with primitive block 606 whilst region 614 overlaps with primitive block 608. Since primitive block 606 comes before primitive block 608 in the sequence of primitive blocks (i.e. the sequence number of primitive block 606 is lower than that of primitive block 608) it may be better to process the tiles of region 612 before the tiles of region 614. This is because it is likely that primitive block 606 has been processed for a greater amount of time (because a primitive block is allocated to one of the tiling engine pipes as and when a tiling engine pipe becomes available, and since primitive block 606 comes before primitive block 608 in the sequence of primitive blocks, primitive block 606 is likely to be allocated to a tiling engine pipe before primitive block 608). Therefore, primitive block 606 is more likely than primitive block 608 to be waiting for the tiles in the overlapping regions of primitive block 604 to be processed. After processing the tiles from regions 612 and 614 the tiles in the regions 616 and 618 are processed by the tiling engine pipe $110_0$.

The tiling engine pipe $110_1$ determines that there is a first region 620 of primitive block 606 (labelled "R012" in FIG. 6c) which is overlapping with both of the primitive blocks 604 and 608, and is given a priority of zero. The tiling engine pipe $110_1$ also determines that there is a second region 622 of primitive block 606 (labelled "R1" in FIG. 6c) which is non-overlapping with the primitive blocks 604 and 608, and is given a priority of zero. The tiling engine pipe $110_1$ also determines that there is a third region 624 of primitive block 606 (labelled "R01" in FIG. 6c) which is overlapping with the primitive block 604, and is given a priority of minus one.

Therefore, the tiling engine pipe $110_1$ may choose to process tiles from the region 620 or 622 first since they have the equal highest priority. As described above, when the tiling engine pipe $110_0$ has finished the processing for the tiles in the region 610 (region R012) it may send an indication to the tiling engine pipe $110_1$ to indicate that this processing has been finished. The indication can simply indicate that region R012 has been processed in tiling engine pipe $110_0$ (rather than needing to specify each tile of the region R012) since this region includes the same tiles in both the primitive blocks 604 and 606. Before the tiling engine pipe $110_1$ receives this indication it may choose to process tiles from region 622 before the tiles from region 620. However, when the indication is received from the tiling engine pipe $110_0$, the priority of region 620 can be increased such that tiles from that region are the next to be processed by the tiling engine pipe $110_1$. The tiling engine pipe $110_1$ stores an indication of the tiles which have been processed in each of the regions. Therefore, if the processing switches from region 622 to region 620, e.g. in response to a signal from the tiling engine pipe $110_0$, when some but not all of the tiles of the region 622 have been processed, then an indication keeps track of which tiles of the region 622 have been processed. Therefore, when the tiles in the region 620 have been processed, the tiling engine pipe $110_1$ can use the indication to determine which of the tiles from region 622 have not yet been processed, and can then proceed to process those tiles. After processing the tiles from regions 620 and 622, the tiles in the region 624 are processed by the tiling engine pipe $110_1$.

As will be apparent, the tiling engine pipe $110_2$ determines that there is a first region 626 of primitive block 608 (labelled "R2" in FIG. 6d) which is non-overlapping with the primitive blocks 604 and 606, and is given a priority of zero. The tiling engine pipe $110_2$ also determines that there is a second region 628 of primitive block 608 (labelled "R02" in FIG. 6d) which is overlapping with the primitive block 604, and is given a priority of minus one. The tiling engine pipe $110_2$ also determines that there is a third region 630 of primitive block 608 (labelled "R012" in FIG. 6d) which is overlapping with the primitive blocks 604 and 606, and is given a priority of minus two. Therefore, the tiling engine pipe $110_2$ will process tiles from the region 626 first, followed by tiles from the region 628 and then followed by tiles from the region 630.

There is a further modification to the examples described above which can be made to simplify the processing performed by the tiling engine pipes 110. It can be seen that in the examples shown in FIGS. 5a to 6d, the determined regions can have non-rectangular shapes. In examples described below the regions are determined to be rectangular. Having rectangular regions makes the definition of the regions trivial since a rectangle can be defined by specifying the location of two opposing corners or by specifying the location of one corner and the dimensions of the rectangle (thereby reducing the amount of data required to define the regions). Furthermore, having rectangular regions also makes the determination as to which tiles are included in which regions trivial.

One method of determining the regions is to adaptively split the bounding box of a primitive block into smaller, rectangular regions. The hardware for a tiling engine pipe 110 may have storage for a maximum number of regions. The maximum number of regions may for example be ten or fifteen, or any other suitable number that is appropriate for the storage limitations of the tiling unit 104. This allows for a fixed memory allocation to be used which is much more respectful of hardware limitations than having a variable memory allocation available for the tiling unit 104. If the number of regions that would be used to fully define each separate priority region using rectangular regions is greater than the maximum number of regions that can be stored then the number of regions is limited to be the maximum number and the priorities of the regions is adjusted to account for the fact that some of the regions may include tiles which overlap with different primitive blocks. For example, if a region would normally be split into two regions with one region having a higher priority than the other, but the region cannot be split due to the limit on the number of regions then the whole region may be assigned the higher of the two priorities.

Figure 7A:
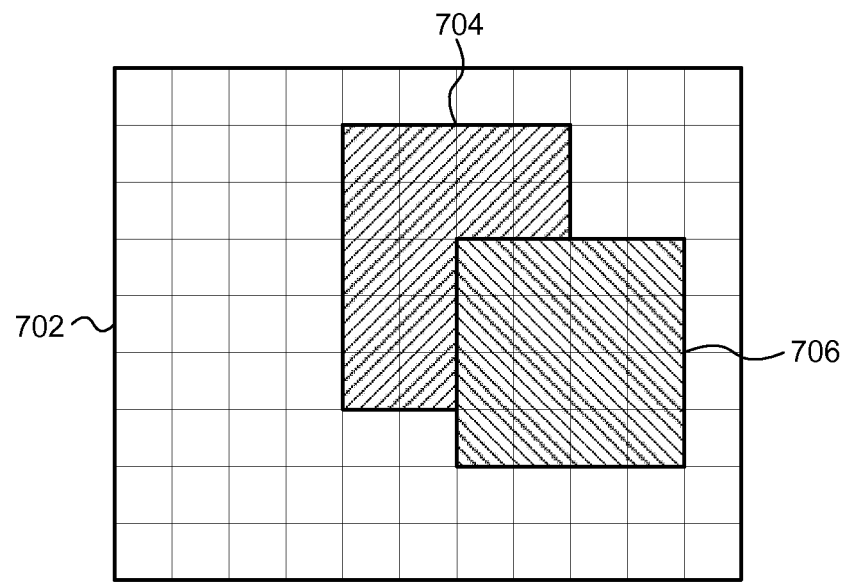
FIGS. 7a to 7c represent priorities for regions of two overlapping primitive blocks in a fifth example.
Figure 7B:
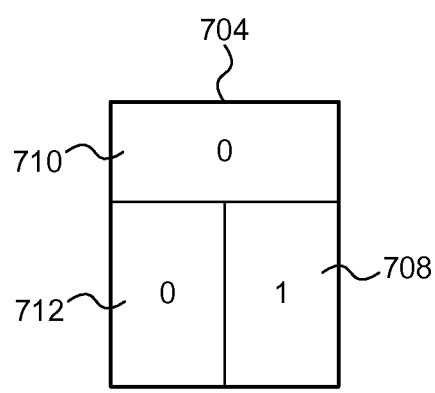

FIG. 7a shows a rendering space 702 which has primitive blocks 704 and 706 in a corresponding arrangement to the primitive blocks 504 and 506 shown in FIG. 5a. FIG. 7b shows the regions and the priorities that are determined for the primitive block 704. The primitive block 704 includes region 708 which has a priority of one because it overlaps with primitive block 706. The primitive block 704 also includes two regions 710 and 712 which have a priority of zero because they are non-overlapping. It can be seen that the regions 708 to 712 are rectangular. Comparing FIG. 7b to FIG. 5b it can be seen that in FIG. 7b although there are more regions, each of the regions is rectangular so the amount of data needed to define the regions 708, 710 and 712 will typically be less than the amount of data needed to define the regions 508 and 510. Furthermore, it is trivial to determine which region a tile is within when the regions are all rectangular.

Figure 7C:
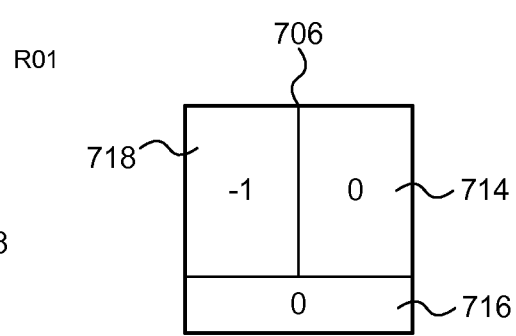

Similarly, FIG. 7c shows the regions and the priorities that are determined for the primitive block 706. The primitive block 706 includes regions 714 and 716 which have a priority of zero because they are non-overlapping. The primitive block 706 also includes a region 718 which has a priority of minus one because it overlaps with primitive block 704.

In accordance with the principles of the examples described above, it will be apparent how the processing of the primitives in the primitive blocks 704 and 706 is performed in parallel by the tiling engine pipes $110_0$ and $110_1$ based on the priorities shown in FIGS. 7b and 7c.

As described above, each time a tiling engine pipe 110 starts to process a new primitive block the bounding box and the sequence number of the new primitive block is broadcast to all of the other tiling engine pipes. Each tiling engine pipe then re-determines the regions and priorities for its respective primitive block.

For example FIG. 8a shows a rendering space 802 which has primitive blocks 804, 806 and 808 in a corresponding arrangement to the primitive blocks 604, 606 and 608 shown in FIG. 6a. FIG. 8b shows the regions and the priorities that are determined for the primitive block 804. The primitive block 804 includes region 810 which has a priority of two because it overlaps with both primitive blocks 806 and 808. The primitive block 804 also includes regions 812 and 814 which have a priority of one because they are overlapping with primitive block 806. The primitive block 804 also includes regions 816 and 818 which have a priority of one because they are overlapping with primitive block 808. The primitive block 804 also includes regions 820, 822 and 824 which have a priority of zero because they are non-overlapping with either primitive block 806 or primitive block 808. It can be seen that the regions 810 to 824 are rectangular.

Similarly, FIG. 8c shows the regions and the priorities that are determined for the primitive block 806. The primitive block 806 includes a region 826 which has a priority of zero because it is overlapping with both primitive blocks 804 and 808. The primitive block 806 also includes regions 832 and 834 which have a priority of minus one because they are overlapping with primitive block 804. The primitive block 806 also includes regions 828 and 830 which have a priority of zero because they are non-overlapping with either primitive block 804 or primitive block 808.

Similarly, FIG. 8d shows the regions and the priorities that are determined for the primitive block 808. The primitive block 808 includes region 836 which has a priority of zero because it is non-overlapping with either primitive block 804 or primitive block 806. The primitive block 808 also includes regions 838 and 840 which have a priority of minus one because they are overlapping with primitive block 804. The primitive block 808 also includes a region 842 which has a priority of minus two because it is overlapping with both primitive blocks 804 and 806.

Indications of the rectangular regions which have been determined and the indications of the tiles in those regions which have been processed are stored for each of the tiling engine pipes 110, and these indications fully define the processing that remains to be performed on the current primitive blocks, i.e. no other information need be stored to determine which tiles still need to be processed, and which have already been processed. Furthermore, the performance gain achieved by the sequencing described herein (that is, the reduction in idle time of the tiling engine pipes) increases as the maximum number of regions that can be determined is increased, up to a point at which all of the different overlapping regions can be defined in separate regions. There is a range in which the performance of the sequencing is proportional to the maximum number of regions that the hardware of the tiling unit 104 has storage for. Furthermore, when the maximum number of regions is reached the performance of the system will decrease in a graceful manner. That is, when the maximum number of regions is reached, further regions are not created, so some of the priorities might not be optimal and so the ordering of the processing performed by the tiling engine pipes might not be optimal, but this will just result in slightly more idle time of the tiling engine pipes. This detrimental effect of a slight increase in idle time away from the optimum idle time might be considered to be insignificant compared to the benefit achieved by limiting the storage that is required in the hardware of the tiling unit 104, so setting a maximum for the number of regions is still often beneficial. The value of the maximum number is implementation specific and may be chosen as a trade-off between the storage limitation of the hardware and the reduction in the idle time of the tiling engine pipes that is desired.

In the examples described above (e.g. in FIG. 1) there are three tiling engine pipes 110. In other examples, there may be a different number of tiling engine pipes (e.g. 2, 4 or more) which are configured to process respective primitive blocks in parallel.

In examples described above, most of the processing (e.g. the determining of the overlapping regions, the determining of the priorities for the regions, the communication of signals to indicate the bounding boxes and sequence numbers of the primitive blocks currently being processed in the tiling engine pipes 110, the communication of an indication that a tile has been processed, and the increasing of the priority of an overlapping region when another tiling engine pipe has finished processing the tile(s) in the overlapping region for an earlier primitive block) is performed in the tiling engine pipes 110. In these examples, signals can be sent (e.g. broadcast) between the different tiling engine pipes 110 to allow the tiling engine pipes 110 to operate in a coordinated manner. In these examples, the role of the control module 108 may be to distribute new primitive blocks to the tiling engine pipes 110 when they become available. In other examples, the control module 108 may perform some of the processing that is described above as being performed in the tiling engine pipes 110. For example, the control module 108 may have access to the bounding boxes and sequence numbers of the primitive blocks that are being processed in the different tiling engine pipes 110. In this case, the control module 108 can determine the regions and/or the priorities of the regions for use by the tiling engine pipes 110 in processing the tiles of the respective primitive blocks. As another example, the tiling engine pipes 110 might not communicate directly with each other, and instead signals may be sent from the tiling engine pipes 110 to the control module 108. An example of such signals are the signals indicating that a tiling engine pipe 100 has finished the processing for a tile. The control module 108 can use these signals to update the priorities of overlapping regions for other primitive blocks which are currently being processed in other tiling engine pipes as described above. The control module 108 may act as a hub that all communications go through.

In an extreme example, the control module 108 may perform all of the processing to determine the regions and the priorities for all of the primitive blocks that are currently being processed; to update the priorities and/or regions when it receives an indication that a tiling engine pipe 110 has finished processing a tile; and to determine which tile each of the tiling engine pipes 110 is to process next. The control module 108 can then send indications to the tiling engine pipes 110 to indicate which tiles the tiling engine pipes 110 are to process next, and the tiling engine pipes 110 signal back to the control module 108 when a tile has been processed.

In this way, some of the functionality performed by the tiling engine pipes 110 in the main examples described above can be offloaded onto the control module 108 and performed centrally.

Generally, any of the functions, methods, techniques or components described above can be implemented in modules using software, firmware, hardware (e.g., fixed logic circuitry), or any combination of these implementations. The terms "module," "functionality," "component", "block", "unit" and "logic" are used herein to generally represent software, firmware, hardware, or any combination thereof.

In the case of a software implementation, the module, functionality, component, block, unit or logic represents program code that performs specified tasks when executed on a processor (e.g. one or more CPUs). In one example, the methods described may be performed by a computer configured with software in machine readable form stored on a computer-readable medium. One such configuration of a computer-readable medium is signal bearing medium and thus is configured to transmit the instructions (e.g. as a carrier wave) to the computing device, such as via a network. The computer-readable medium may also be configured as a non-transitory computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The software may be in the form of a computer program comprising computer program code for configuring a computer to perform the constituent portions of described methods or in the form of a computer program comprising computer program code means adapted to perform all the steps of any of the methods described herein when the program is run on a computer and where the computer program may be embodied on a computer readable medium. The program code can be stored in one or more computer readable media. The features of the techniques described herein are platform-independent, meaning that the techniques may be implemented on a variety of computing platforms having a variety of processors.

Those skilled in the art will also realize that all, or a portion of the functionality, techniques or methods may be carried out by a dedicated circuit, an application-specific integrated circuit, a programmable logic array, a field-programmable gate array, or the like. For example, the module, functionality, component, block, unit or logic may comprise hardware in the form of circuitry. Such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnects, by way of example. Such elements may be provided as custom circuits or standard cell libraries, macros, or at other levels of abstraction. Such elements may be interconnected in a specific arrangement. The module, functionality, component, block, unit or logic may include circuitry that is fixed function and circuitry that can be programmed to perform a function or functions; such programming may be provided from a firmware or software update or control mechanism. In an example, hardware logic has circuitry that implements a fixed function operation, state machine or process.

It is also intended to encompass software which "describes" or defines the configuration of hardware that implements a module, functionality, component or logic described above, such as HDL (hardware description language) software, as is used for designing integrated circuits, or for configuring programmable chips, to carry out desired functions. That is, there may be provided a computer readable storage medium having encoded thereon computer readable program code for generating a tiling unit configured to perform any of the methods described herein, or for generating a tiling unit comprising any apparatus described herein.

The term 'processor' and 'computer' are used herein to refer to any device, or portion thereof, with processing capability such that it can execute instructions, or a dedicated circuit capable of carrying out all or a portion of the functionality or methods, or any combination thereof.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It will be understood that the benefits and advantages described above may relate to one example or may relate to several examples.

Any range or value given herein may be extended or altered without losing the effect sought, as will be apparent to the skilled person. The steps of the methods described herein may be carried out in any suitable order, or simultaneously where appropriate. Aspects of any of the examples described above may be combined with aspects of any of the other examples described to form further examples without losing the effect sought.

The invention claimed is:

1. A method of processing in a plurality of tiling engine pipes within a graphics processing system configured to use a rendering space which is subdivided into a plurality of tiles, a sequence of primitive blocks each including at least one primitive, wherein the tiling engine pipes are arranged to process respective primitive blocks in parallel, and wherein a location of each of the primitive blocks within the rendering space is indicated by a respective location indicator, and a position of each of the primitive blocks within the sequence of primitive blocks is indicated by a respective sequence indicator, the method comprising, for each of a plurality of the respective primitive blocks:

determining a priority for each of a plurality of regions of the respective primitive block, each of the regions comprising one or more tiles, wherein if location indicators of primitive blocks currently being processed in the parallel tiling engine pipes indicate that there are overlapping primitive blocks within a particular region of the respective primitive block then the priority for the particular region is determined based on the sequence indicators of the overlapping primitive blocks currently being processed in the parallel tiling engine pipes; and processing primitives of the respective primitive block for tiles of the regions of the respective primitive block in a tile-order based on the determined priorities for the regions, to thereby determine for each of the tiles of the regions of the respective primitive block, which, if any, of the primitives of the respective primitive block are present within the tile.

2. The method of claim 1 wherein determining the priority for the particular region comprises comparing the sequence indicator of the respective primitive block with the sequence indicator of each of the overlapping primitive blocks, wherein for each of the overlapping primitive blocks:

if the sequence indicator of the respective primitive block is greater than that of the overlapping primitive block, the priority of the particular region of the respective primitive block is decreased, and if the sequence indicator of the respective primitive block is less than that of the overlapping primitive block, the priority of the particular region of the respective primitive block is increased.

3. The method of claim 1 further comprising determining the regions by determining overlapping regions of the primitive blocks currently being processed in the parallel tiling engine pipes.

4. The method of claim 1 wherein each of the regions is a tile, such that a priority is determined for each of the tiles of the respective primitive block.

5. The method of claim 1 further comprising sending from a tiling engine pipe processing a new primitive block, a signal including the location indicator and the sequence indicator of the new primitive block to other tiling engine pipes.

6. The method of claim 5 wherein the signal including the location indicator and the sequence indicator of the new primitive block is sent from either: (i) a tiling engine pipe that starts to process the new primitive block, or (ii) a control module.

7. The method of claim 1 further comprising, in each of the tiling engine pipes that are processing a respective primitive block:

(i) receiving a signal including a location indicator and a sequence indicator of a new primitive block that another tiling engine pipe is starting to process; and (ii) responsive to receiving the signal, re-determining the priorities for regions of the respective primitive block based on the received signal.

8. The method of claim 7 further comprising determining the regions by determining overlapping regions of the primitive blocks currently being processed in the parallel tiling engine pipes, wherein each of the tiling engine pipes which is processing a respective primitive block re-determines the regions responsive to receiving the signal.

9. The method of claim 1 further comprising re-determining the priorities for regions of a first primitive block that a first tiling engine pipe is processing based on a location indicator and a sequence indicator of a new primitive block that a second tiling engine pipe is starting to process.

10. The method of claim 9 further comprising determining the regions by determining overlapping regions of the primitive blocks currently being processed in the parallel tiling engine pipes, wherein the control module re-determines the regions of the primitive blocks being processed by the tiling engine pipes based on the location indicator of the new primitive block.

11. The method of claim 1 further comprising sending, from a tiling engine pipe that has finished processing primitives of a primitive block in an overlapping region for which there is at least one overlapping primitive block currently being processed in at least one other tiling engine pipe, a signal indicating that the primitives of the primitive block in the overlapping region have been processed.

12. The method of claim 1 further comprising, in each of the tiling engine pipes which is processing a respective primitive block:

(i) receiving a signal which indicates that the primitives of another primitive block in an overlapping region have been processed in another tiling engine pipe; and (ii) responsive to receiving the signal, increasing the priority for the overlapping region of the respective primitive block based on the received signal.

13. The method of claim 1 further comprising:

(i) receiving a signal which indicates that the primitives of a first primitive block in an overlapping region have been processed in a first tiling engine pipe; and (ii) responsive to receiving the signal, increasing the priority for the overlapping region of a second primitive block.

14. The method of claim 1 wherein said processing primitives of the respective primitive block comprises:

processing primitives for a set of one or more tiles in each of a plurality of iterations, wherein on each iteration the set of one or more tiles is selected, based on the priorities of the regions, from the tiles which have not yet been processed for the respective primitive block.

15. The method of claim 14 wherein:

(i) if a plurality of sets of one or more tiles are from regions which have an equal highest priority for tiles which have not yet been processed, selecting a set based on a raster scan order of the tiles, or (ii) if a plurality of sets of one or more tiles are from regions which have an equal highest priority for tiles which have not yet been processed and which are overlapping with different other ones of the primitive blocks currently being processed, selecting a set based on the sequence indicators of said overlapping other ones of the primitive blocks.

16. The method of claim 1 wherein said processing primitives of the respective primitive block for tiles of the regions of the respective primitive block comprises writing, to display lists of the tiles, primitive identifiers of the primitives of the respective primitive block which are determined to be present within the respective tiles, wherein said writing primitive identifiers of the primitives of the respective primitive block to the display list of a tile comprises checking that a primitive block with an earlier sequence number which is currently being processed in another tiling engine pipe has no further primitive identifiers to write to the display list of the tile.

17. The method of claim 1 wherein the location indicator of a primitive block is a bounding box of the primitive block.

18. A tiling unit configured to process a sequence of primitive blocks within a graphics processing system configured to use a rendering space which is subdivided into a plurality of tiles, wherein the tiling unit is configured to use a respective location indicator to indicate a location of each of the primitive blocks within the rendering space, and to use a respective sequence indicator to indicate a position of each of the primitive blocks within the sequence of primitive blocks, wherein the tiling unit comprises a plurality of tiling engine pipes which are configured to process respective primitive blocks in parallel, and wherein for each of a plurality of the respective primitive blocks, the tiling unit is configured to:

determine a priority for each of a plurality of regions of the respective primitive block, each of the regions comprising one or more tiles, wherein if the location indicators of the primitive blocks being processed in the parallel tiling engine pipes indicate that there are overlapping primitive blocks within a particular region of the respective primitive block then the priority for the particular region is determined based on the sequence indicators of the overlapping primitive blocks being processed in the parallel tiling engine pipes; and use the tiling engine pipe which is configured to process the respective primitive block to process primitives of the respective primitive block for tiles of the regions of the respective primitive block in a tile-order based on the determined priorities for the regions, to thereby determine for each of the tiles of the regions of the respective primitive block, which, if any, of the primitives of the respective primitive block are present within the tile.

19. The tiling unit of claim 18 wherein the tiling unit is configured to determine the priorities for the plurality of regions of the respective primitive block using either: (i) the tiling engine pipe which is arranged to process the respective primitive block, or (ii) a control module of the tiling unit.

20. A non-transitory computer readable storage medium having stored thereon processor executable instructions that when executed cause at least one processor to process a sequence of primitive blocks in a plurality of tiling engine pipes within a graphics processing system configured to use a rendering space which is subdivided into a plurality of tiles, each primitive block including at least one primitive, wherein the tiling engine pipes are arranged to process respective primitive blocks in parallel, and wherein a location of each of the primitive blocks within the rendering space is indicated by a respective location indicator, and a position of each of the primitive blocks within the sequence of primitive blocks is indicated by a respective sequence indicator, the processing of the sequence of primitive blocks comprising, for each of a plurality of the respective primitive blocks:

determining a priority for each of a plurality of regions of the respective primitive block, each of the regions comprising one or more tiles, wherein if the location indicators of the primitive blocks currently being processed in the parallel tiling engine pipes indicate that there are overlapping primitive blocks within a particular region of the respective primitive block then the priority for the particular region is determined based on the sequence indicators of the overlapping primitive blocks currently being processed in the parallel tiling engine pipes; and processing primitives of the respective primitive block for tiles of the regions of the respective primitive block in a tile-order based on the determined priorities for the regions, to thereby determine for each of the tiles of the regions of the respective primitive block, which, if any, of the primitives of the respective primitive block are present within the tile.

21. A non-transitory computer readable storage medium having stored thereon processor executable instructions that when executed at a computer system for generating a representation of a digital circuit from definitions of circuit elements and data defining rules for combining those circuit elements, cause the computer system to generate a tiling unit configured to process a sequence of primitive blocks within a graphics processing system configured to use a rendering space which is subdivided into a plurality of tiles, each primitive block including at least one primitive, wherein the tiling unit is configured to use a respective location indicator to indicate a location of each of the primitive blocks within the rendering space, and to use a respective sequence indicator to indicate a position of each of the primitive blocks within the sequence of primitive blocks, wherein the tiling unit comprises a plurality of tiling engine pipes which are configured to process respective primitive blocks in parallel, and wherein for each of a plurality of the respective primitive blocks, the tiling unit is configured to:

determine a priority for each of a plurality of regions of the respective primitive block, each of the regions comprising one or more tiles, wherein if the location indicators of the primitive blocks being processed in the parallel tiling engine pipes indicate that there are overlapping primitive blocks within a particular region of the respective primitive block then the priority for the particular region is determined based on the sequence indicators of the overlapping primitive blocks being processed in the parallel tiling engine pipes; and use the tiling engine pipe which is configured to process the respective primitive block to process primitives of the respective primitive block for tiles of the regions of the respective primitive block in a tile-order based on the determined priorities for the regions, to thereby determine for each of the tiles of the regions of the respective primitive block, which, if any, of the primitives of the respective primitive block are present within the tile.

* * * * *